(12) United States Patent
Rinzler et al.

(10) Patent No.: US 10,815,576 B2
(45) Date of Patent: Oct. 27, 2020

(54) CARBON DIOXIDE REDUCTION OVER CARBON-CONTAINING MATERIALS

(71) Applicant: University of Florida Research Foundation, Inc., Gainesville, FL (US)

(72) Inventors: Andrew Gabriel Rinzler, Newberry, FL (US); Rajib Kumar Das, Gainesville, FL (US); Svetlana V. Vasilyeva, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 249 days.

(21) Appl. No.: 15/038,126

(22) PCT Filed: Nov. 20, 2014

(86) PCT No.: PCT/US2014/066714
§ 371 (c)(1),
(2) Date: May 20, 2016

(87) PCT Pub. No.: WO2015/077508
PCT Pub. Date: May 28, 2015

(65) Prior Publication Data
US 2016/0281245 A1    Sep. 29, 2016

Related U.S. Application Data

(60) Provisional application No. 61/906,616, filed on Nov. 20, 2013.

(51) Int. Cl.
*C25B 3/04* (2006.01)
*C25B 11/12* (2006.01)
(Continued)

(52) U.S. Cl.
CPC ............. *C25B 3/04* (2013.01); *B82Y 30/00* (2013.01); *C25B 1/00* (2013.01); *C25B 9/10* (2013.01);
(Continued)

(58) Field of Classification Search
CPC ........................................................ C25B 3/04
(Continued)

(56) References Cited

U.S. PATENT DOCUMENTS 4,601,797 A   7/1986  Wagenknecht
4,673,473 A   6/1987  Ang et al.
(Continued)

FOREIGN PATENT DOCUMENTS

CN    1214710 A    4/1999
CN    1386909 A    12/2002
(Continued)

OTHER PUBLICATIONS

Liu et al., "Folded Structured Graphene Paper for High Performance Electrode Materials," Adv. Mater. (2002), vol. 24, pp. 1089-1094. (Year: 2002).*

(Continued)

*Primary Examiner* — Edna Wong
(74) *Attorney, Agent, or Firm* — Wolf, Greenfield & Sacks, P.C.

(57) ABSTRACT

Disclosed herein are various layered, carbon-containing materials for use in reducing carbon dioxide. In certain embodiments, the materials comprise single wall carbon nanotubes (SWNTs).

16 Claims, 3 Drawing Sheets

(51) Int. Cl.
*B82Y 30/00* (2011.01)
*C25B 1/00* (2006.01)
*C25B 9/10* (2006.01)
*C25B 11/04* (2006.01)
*C25B 13/02* (2006.01)
*C25B 13/04* (2006.01)

(52) U.S. Cl.
CPC ...... *C25B 11/0405* (2013.01); *C25B 11/0447* (2013.01); *C25B 11/12* (2013.01); *C25B 13/02* (2013.01); *C25B 13/04* (2013.01)

(58) Field of Classification Search
USPC ................ 205/448, 450, 457, 462, 555, 413
See application file for complete search history.

(56) References Cited

U.S. PATENT DOCUMENTS

| | | | |
|---|---|---|---|
| 5,013,339 A | 5/1991 | Mahoney et al. | |
| 5,238,674 A | 8/1993 | Vercoulen et al. | |
| 5,417,757 A | 5/1995 | Merienne et al. | |
| 5,456,943 A | 10/1995 | Guhl et al. | |
| 5,560,898 A | 10/1996 | Uchida et al. | |
| 5,853,877 A | 12/1998 | Shibuta | |
| 6,127,061 A | 10/2000 | Shun et al. | |
| 6,232,706 B1 | 5/2001 | Dai et al. | |
| 6,331,262 B1 | 12/2001 | Haddon et al. | |
| 6,331,272 B1 | 12/2001 | Sims | |
| 6,369,934 B1 | 4/2002 | Bechinger et al. | |
| 6,566,983 B2 | 5/2003 | Shin | |
| 6,590,231 B2 | 7/2003 | Watanabe et al. | |
| 6,645,455 B2 | 11/2003 | Margrave et al. | |
| 6,831,017 B1 | 12/2004 | Li et al. | |
| 6,903,365 B1 | 6/2005 | Nihei | |
| 6,936,233 B2 | 8/2005 | Smalley et al. | |
| 7,037,619 B2 | 5/2006 | Yamaura et al. | |
| 7,060,241 B2 | 6/2006 | Glatkowski | |
| 7,122,165 B2 | 10/2006 | Wong et al. | |
| 7,261,852 B2* | 8/2007 | Rinzler .................. | B82Y 10/00 264/317 |
| 7,351,444 B2 | 4/2008 | Wang et al. | |
| 7,572,743 B2 | 8/2009 | Rinzler et al. | |
| 7,704,479 B2 | 4/2010 | Rinzler et al. | |
| 7,776,444 B2 | 8/2010 | Rinzler et al. | |
| 7,972,699 B2 | 7/2011 | Rinzler et al. | |
| 8,168,965 B2 | 5/2012 | Rinzler et al. | |
| 8,221,937 B2 | 7/2012 | Dai | |
| 9,368,291 B2 | 6/2016 | Rinzler et al. | |
| 9,742,018 B2 | 8/2017 | Rinzler et al. | |
| 10,115,972 B2 | 10/2018 | Rinzler et al. | |
| 2002/0172639 A1 | 11/2002 | Horiuchi et al. | |
| 2002/0176650 A1 | 11/2002 | Zhao et al. | |
| 2003/0122111 A1 | 7/2003 | Glatkowski | |
| 2004/0066094 A1 | 4/2004 | Suzuki et al. | |
| 2004/0197546 A1 | 10/2004 | Rinzler et al. | |
| 2004/0197638 A1 | 10/2004 | McElrath et al. | |
| 2004/0198850 A1 | 10/2004 | Connor et al. | |
| 2005/0026411 A1 | 2/2005 | Tanamoto et al. | |
| 2005/0098437 A1 | 5/2005 | Shiepe | |
| 2005/0100960 A1 | 5/2005 | Dai et al. | |
| 2005/0142428 A1 | 6/2005 | Daimon et al. | |
| 2005/0147553 A1 | 7/2005 | Wong et al. | |
| 2005/0199894 A1 | 9/2005 | Rinzler et al. | |
| 2005/0202578 A1 | 9/2005 | Yaniv et al. | |
| 2005/0266162 A1 | 12/2005 | Luo et al. | |
| 2006/0029537 A1 | 2/2006 | Zhang et al. | |
| 2006/0172179 A1 | 8/2006 | Gu et al. | |
| 2006/0220251 A1 | 10/2006 | Kloster et al. | |
| 2006/0223991 A1 | 10/2006 | Zhang et al. | |
| 2006/0237805 A1 | 10/2006 | Segal et al. | |
| 2006/0251542 A1* | 11/2006 | Sims ........................ | A61L 2/186 422/33 |
| 2007/0092787 A1 | 4/2007 | Chen | |
| 2007/0114573 A1 | 5/2007 | Han et al. | |
| 2007/0141345 A1 | 6/2007 | Rinzler et al. | |
| 2007/0172718 A1 | 7/2007 | Lee et al. | |
| 2007/0184972 A1 | 8/2007 | Roev et al. | |
| 2008/0020923 A1 | 1/2008 | Debe et al. | |
| 2008/0182155 A1 | 7/2008 | Choi et al. | |
| 2008/0210950 A1 | 9/2008 | Sung | |
| 2009/0136849 A1 | 5/2009 | Yue et al. | |
| 2009/0138649 A1 | 5/2009 | Chew et al. | |
| 2009/0246625 A1 | 10/2009 | Lu | |
| 2010/0097742 A1 | 4/2010 | Adzic et al. | |
| 2010/0272981 A1 | 10/2010 | Rinzler et al. | |
| 2011/0186785 A1 | 8/2011 | Kato et al. | |
| 2012/0031852 A1 | 2/2012 | Aglietto | |
| 2012/0045688 A1 | 2/2012 | Liu et al. | |
| 2012/0115049 A1 | 5/2012 | Rinzler et al. | |
| 2013/0026029 A1 | 1/2013 | Kayeart et al. | |
| 2013/0105304 A1 | 5/2013 | Kaczur et al. | |
| 2013/0105330 A1* | 5/2013 | Teamey .................. | C25B 1/00 205/349 |
| 2013/0146470 A1* | 6/2013 | Wang .................. | H01M 16/003 205/343 |
| 2013/0273446 A1* | 10/2013 | Rinzler .................. | H01M 4/90 429/422 |
| 2014/0083752 A1 | 3/2014 | Walczak et al. | |
| 2016/0185602 A1 | 6/2016 | Walczak et al. | |
| 2016/0192484 A1 | 6/2016 | Walczak et al. | |
| 2017/0005351 A1 | 1/2017 | Rinzler et al. | |

FOREIGN PATENT DOCUMENTS

| | | | |
|---|---|---|---|
| CN | 1466788 A | 1/2004 | |
| CN | 1546431 A | 11/2004 | |
| CN | 2893940 Y | 4/2007 | |
| CN | 100595953 C | 3/2010 | |
| CN | 101721944 A | 6/2010 | |
| CN | 103140608 A | 6/2013 | |
| CN | 103233240 A | 8/2013 | |
| EP | 1878763 A2 | 1/2008 | |
| JP | H06-038265 U | 5/1994 | |
| JP | H07-048111 A | 2/1995 | |
| JP | 2000-086216 A | 3/2000 | |
| JP | 2000-203821 A | 7/2000 | |
| JP | 2001-035362 A | 2/2001 | |
| JP | 2002-305087 A | 10/2002 | |
| JP | 2002-338221 A | 11/2002 | |
| JP | 2002-346996 A | 12/2002 | |
| JP | 2003-146632 A | 5/2003 | |
| JP | 2003-178816 A | 6/2003 | |
| JP | 2003-209270 A | 7/2003 | |
| JP | 2003-288835 A | 10/2003 | |
| JP | 2004-042253 A | 2/2004 | |
| JP | 2004-080987 A | 3/2004 | |
| JP | 2004-158290 A | 6/2004 | |
| JP | 2004-315297 A | 11/2004 | |
| JP | 2004-537174 A | 12/2004 | |
| JP | 2005-047763 A | 2/2005 | |
| JP | 2005-057012 A | 3/2005 | |
| JP | 2005-294109 A | 10/2005 | |
| JP | 2006-513557 A | 4/2006 | |
| JP | 2006-265151 A | 10/2006 | |
| JP | 2007-515364 A | 6/2007 | |
| JP | 2007-214130 A | 8/2007 | |
| JP | 2007-258030 A | 10/2007 | |
| JP | 2007-297644 A | 11/2007 | |
| JP | 2008-505832 A | 2/2008 | |
| JP | 2008-542980 A | 11/2008 | |
| JP | 2009-093983 A | 4/2009 | |
| JP | 2009-533227 A | 9/2009 | |
| JP | 2009-536911 A | 10/2009 | |
| JP | 2009-541198 A | 11/2009 | |
| JP | 2010-506824 A | 3/2010 | |
| JP | 2010-515779 A | 5/2010 | |
| JP | 2010-255018 A | 11/2010 | |
| JP | 2010255018 A * | 11/2010 | ............... C25B 9/00 |
| JP | 2010-232040 A | 4/2012 | |
| JP | 2012-082120 A | 4/2012 | |
| KR | 10-1999-0082415 A | 11/1999 | |
| KR | 10-2001-0101692 | 11/2001 | |
| KR | 10-2007-0730197 B1 | 6/2007 | |

(56) References Cited

FOREIGN PATENT DOCUMENTS

| KR | 2007-0100594 A | 10/2007 |
|---|---|---|
| KR | 10-2008-0073751 A | 8/2008 |
| KR | 10-2009-0079935 A | 7/2009 |
| RU | 2303836 C1 | 7/2007 |
| WO | WO 97/00925 A1 | 1/1997 |
| WO | WO 98/25758 A1 | 6/1998 |
| WO | WO 03/107451 A2 | 12/2003 |
| WO | WO 2004/009884 A1 | 1/2004 |
| WO | WO 2004/040590 A2 | 5/2004 |
| WO | WO 2004/109837 A2 | 12/2004 |
| WO | WO 2005/014889 A2 | 2/2005 |
| WO | WO 2005/029528 A1 | 3/2005 |
| WO | WO 2005/044723 A2 | 5/2005 |
| WO | WO 2005/083571 A2 | 9/2005 |
| WO | WO 2005/083751 A1 | 9/2005 |
| WO | WO 2006/001790 A1 | 1/2006 |
| WO | WO 2006/011655 A1 | 2/2006 |
| WO | WO 2007/004758 A1 | 1/2007 |
| WO | WO 2007/101906 A1 | 3/2007 |
| WO | WO 2007/095492 A2 | 8/2007 |
| WO | WO 2008/034939 A1 | 3/2008 |
| WO | WO 2008/046010 A2 | 4/2008 |
| WO | WO 2008/054473 A2 | 5/2008 |
| WO | WO 2010/102759 A1 | 9/2010 |
| WO | WO 2010/126767 A2 | 11/2010 |

OTHER PUBLICATIONS

Yang et al., "Designing Hollow-Fiber Contactors," AIChE Journal (Nov. 1986), vol. 32, No. 11, pp. 1910-1916. (Year: 1986).*
Karoor et al., Gas Absorption Studies in Microporous Hollow Fiber Membrane Modules, Ind. Eng. Chem. Res. (1993), vol. 32, pp. 674-684. (Year: 1993).*
Yamamoto et al., Production of Syngas Plus Oxygen From CO2 in a Gas-Diffusion Electrode-Based Electrolytic Cell, Electrochimica Acta (2002), vol. 42, pp. 3327-3334. (Year: 2002).*
Yamamoto et al., Production of Syngas Plus Oxygen From CO2 in a Gas-Diffusion Electrode-Based Electrolytic Cell, Electrochimica Acta (2002), vol. 47, pp. 3327-3334. (Year: 2002).*
Liu et al., "Folded Structured Graphene Paper for High Performance Electrode Materials," Adv. Mater. (2012), vol. 24, pp. 1089-1094. (Year: 2012).*
Shao et al., Comparative Investigation of the Resistance to Electrochemical Oxidation of Carbon Black and Carbon Nanotubes in Aqueous Sulfuric Acid Solution. Electrochimica Acta. 2006. 51. 5853-7.
Chinese Office Action for Chinese Application No. 201480063051.7 dated Jul. 4, 2017.
Extended European Search Report dated Apr. 5, 2017 for Application No. EP 10770141.9.
Muzibur et al., Studies of Electrochemical Behaviour of SWNT-Film Electrodes. J. Braz. Chem. Soc. 2007. 18;1150-7.
Van De Witte et al., Phase separation processes in polymer solutions in relation to membrane formation. J Membrane Sci. Jan. 1, 1996;117:1-31.
International Search Report and Written Opinion dated Dec. 10, 2008 in connection with Application No. PCT/US2007/078230.
International Preliminary Report on Patentability dated Mar. 17, 2009 in connection with Application No. PCT/US2007/078230.
Partial European Search Report dated Oct. 5, 2016 in connection with Application No. EP 10770141.9.
International Search Report and Written Opinion dated Nov. 19, 2010 in connection with Application No. PCT/US2010/031995.
International Preliminary Report on Patentability dated Nov. 10, 2011 in connection with Application No. PCT/US2010/031995.
International Search Report and Written Opinion dated Jun. 3, 2005 in connection with Application No. PCT/US2005/005575.
International Preliminary Report on Patentability dated Apr. 13, 2006 in connection with Application No. PCT/US2005/005575.
International Search Report and Written Opinion dated Apr. 5, 2007 in connection with Application No. PCT/US2006/036723.
International Preliminary Report on Patentability dated Mar. 26, 2008 in connection with Application No. PCT/US2006/036723.
International Search Report and Written Opinion dated Sep. 26, 2008 in connection with Application No. PCT/US2007/081770.
International Preliminary Report on Patentability dated Apr. 22, 2009 in connection with Application No. PCT/US2007/081770.
International Search Report and Written Opinion dated Mar. 10, 2015 in connection with Application No. PCT/US14/66714.
International Preliminary Report on Patentability dated Jun. 2, 2016 in connection with Application No. PCT/US14/66714.
Extended European Search Report dated Jun. 26, 2014 in connection with Application No. EP 11847983.1.
International Search Report and Written Opinion dated Aug. 28, 2012 in connection with Application No. PCT/US2011/065569.
International Preliminary Report on Patentability dated Jun. 27, 2013 in connection with Application No. PCT/US2011/065569.
Extended European Search Report dated Aug. 6, 2014 in connection with Application No. EP 12767499.2.
International Search Report and Written Opinion dated Oct. 19, 2012 in connection with Application No. PCT/US2012/031950.
International Preliminary Report on Patentability dated Oct. 17, 2013 in connection with Application No. PCT/US2012/031950.
Office communication dated Mar. 19, 2015 in connection with Application No. CN 2010800191988.
Office communication dated Jan. 26, 2016 for Application No. JP 2014-503905.
[No Author Listed], New ink-jet technology for the formation of ultra fine dots less than 1/1000 the size of currently achieved. National Institute of Advanced Industrial Science and Technology (AIST). Press Release. Apr 1, 2002. http://www.aist.go.jp/alst_e/new_research/20020401/20020401.html [last accessed Aug. 23, 2005]. 3 pages.
[No Author Listed], Product Information Sheet for Triton X-100. CAS No. 9002-93-1. Sigma-Aldrich. 2 pages.
Aricó et al., DMFCs: From Fundamental Aspects to Technology Development. Fuel Cells. 2001;1(2):133-61.
Barazzouk et al., Single-Wall Carbon Nanotube Films for Photocurrent Generation. A Prompt Response to Visible-Light Irradiation. J Phys Chem B. 2004;108:17015-8.
Bethune et al., Cobalt-catalysed growth of carbon nanotubes with single-atomic-layer walls. Lett Nature. 1993;363:605-7.
Beverskog et al., Revised Pourbaix diagrams for nickel at 25-300° C. Corros Sci. May 1997;39(5):969-80.
Bidault et al., Review of gas diffusion cathodes for alkaline fuel cells. J Power Sources. 2009;187:39-48.
Bradley et al., Short-channel effects in contact-passivated nanotube chemical sensors. Appl Phys Lett. 2003;83(18):3821-3.
Butt, Carbon-NanoTube Transistors. Purdue University, School of Electrical and Computer Engineering. 6 pages.
Chen et al., Chemically doped double walled carbon nanotubes. Cylindrical Molecular Capacitors. Jun. 27, 2003;90(25):257403.1-4.
Choi et al., Pyrene-containing polystyrene segmented copolymer from nitroxide mediated polymerization and its application for the noncovalent functionalization of as-prepared multiwalled carbon nanotubes. Eur Polym J. Jul. 11, 2008;44:3087-95.
Du et al., Effect of nanotube alignment on percolation conductivity in carbon nanotube/polymer composites. Phys Rev B. 2005;72:12140. 1-4.
Du et al., Preparation and preliminary property study of carbon nanotubes films by electrophoretic deposition. Mater Lett. 2002;57:434-8.
Fan et al., Self-Oriented Regular Arrays of Carbon Nanotubes and their Field Emission Properties. Science. Jan. 22, 1999;283:512-4.
Feng et al., Water Soluble Multi-Walled Nanotube and its Film Characteristics. Chin Phys Lett. 2003;20(5):753-5.
Ferrer-Anglada et al., Conducting transparent thin films based on Carbon Nanotubes-Conducting Polymers. Electronics Properties of Synthetic Nanostructures. Ed. Kuzmany et al. CP723. 2004;591-4.

(56) References Cited

OTHER PUBLICATIONS

Ferrer-Anglada et al., Synthesis and characterization of carbon nanotube-conducting polymer thin films. Diamond Rel Mater. 2004;13:256-60.
Fischer, Magnetically aligned single wall carbon nanotube films:Preferred orientation and anisotropic transport properties. J Appl Phys. Feb. 15, 2003;93(4):2157-63.
Girishkumar et al., Single-wall carbon nanotube-based proton exchange membrane assembly for hydrogen fuel cells. Langmuir. 2005;21(18):8487-94.
Godbole et al., Deposition and characterization of silver nano-films by a novel solid liquid interface reaction technique (SLIRT). Mater Lett. 2005;59:1958-61.
Gong et al., Nitrogen-Doped Carbon Nanotube Arrays with High Electrocatalytic Activity for Oxygen Reduction. Sci. Feb. 6, 2009;323:760-4.
Guo et al., Multi-layer LB films of single-wall carbon nanotubes. Physica B. 2002;323:235-6.
Huang et al., Growth of aligned SWNT arrays from water-soluble molecular cluster for nanotube device fabrication. Phys Chem Chem Phys. 2004;6:1077-9.
Huang et al., Self-organizing high-density single-walled carbon nanotube arrays from surfactant suspensions. Nanotech. 2004;15:1450-4.
Jacquemin et al., Doping mechanism in single-wall carbon nanotubes studied by optical absorption. Synth Metal. 2000;115:283-7.
Kaempgen et al., Transparent CNT Composites, Molecular Nanostructures. XVII International Winterschool/Euroconference on Electronic Properties of Novel Materials. 2003;554-8.
Kataura et al., Optical Properties of Single-Wall Carbon Nanotubes. Synth Metal. 1999;103:2555-8.
Kavan et al., Electrochemical Tuning of Electronic Structure of Single-Walled Carbon Nanotubes: In-situ Raman and Vis-NIR Study. J Phys Chem. 2001;105:10764-71.
Kazaoui et al., Electrochemical tuning of electronic states in single-wall carbon nanotubes studies by in situ absorption spectroscopy and ac resistance. Appl Phys Lett. May 28, 2001;78(22):3433-5.
Kim et al., Homogenous and structurally controlled thin films of single-wall carbon nanotubes by the Langmuir-Blodgett technique. Synth Metal. 2003;(135-6):747-8.
Kim et al., Langmuir-Blodgett films of single-wall carbon nanotubes: layer-by-layer deposition and in-place orientation of tubes. Jap J Appl Phys. 2003;43(12):7629-34.
Kinoshita, Carbon: Electrochemical and physicochemical properties. John Wiley & Sons. 1988;372-3.
Kongkanand et al., Single-Wall Carbon Nanotubes Supported Platinum Nanoparticles with Improved Electrocatalytic Activity for Oxygen Reduction Reaction. Langmuir. 2006;22(5):2392-6.
Le Goff et al., From hydrogenases to noble metal-free catalytic nanomaterials for H2 production and uptake. Science. Dec. 4, 2009;326(5958):1384-7. doi: 10.1126/science.1179773.
Lee et al., Single Wall Carbon Nanotubes for p-Type Ohmic Contacts to GaN Light-Emitting Diodes. Nano Lett. 2004;4(5):911-4.
Li et al., Carbon nanotube film by filtration as cathode catalyst support for proton-exchange membrane fuel cell. Langmuir. Oct. 11, 2005;21(21):9386-9.
Lijima, Helical microtubules of graphitic carbon. Lett Nature. 1991;354:56-8.
Liu et al., Electrochemical Characterization of Films of Single-Walled Carbon Nanotubes and Their Possible Application in Supercapacitors. Electrochem Solid-State Lett. 1999;11:577-8.
Liu et al., Stable non-covalent functionalization of multi-walled carbon nanotubes by pyrene-polyethylene glycol through [pi]-[pi] stacking. New Journal of Chem. 2009;33:1017-24.
Meitl et al., Solution Casting and Transfer Printing Single-Walled Carbon Nanotube Films. Nano Lett. 2004;4(9):1643-7.
Merki et al., Amorphous molybdenum sulfide films as catalysts for electrochemical hydrogen production in water. Chem Sci. 2011;2:1262-7.
Mickelson et al., Fluorination of single-wall carbon nanotubes. Chem Phys Lett. 1998;296:188-94.
Minami, Optical properties of semiconducting and metallic single wall carbon nanotubes: effects of doping and high pressure. Synth Metal. 2001;116:405-9.
Miranda et al., Design of a chemical sensor based on a Carbon Nanotube functionalized with DNA. PASEO 2009. Buenos Aires, Argentina. Mar. 2009. 7 pages.
Misra et al., Hydrogen evolution on hydrophobic aligned carbon nanotube arrays. ACS Nano. Dec. 22, 2009;3(12):3903-8. doi: 10.1021/nn900878d.
Nguyen et al., Synthesis of multi-walled carbon nanotubes for NH3 gas detection. Physica E. 2007;37:54-7.
Nikolaev et al., Gas-phase catalytic growth of single-walled carbon nanotubes from carbon monoxide. Chem Phys Lett. 1999;313:91-7.
Nilsson et al., Scanning field emission from patterned carbon nanotube films. Appl Phys Lett. Apr. 10, 2000;76(15):2071-3.
Nose et al., Electrochemical oxidation of highly oriented pyrolytic graphite in sulphuric acid solution under potential pulse condition. Fuel Cells. Jun. 2009;9(3):284-90.
Novak et al., Macroelectronic application of carbon nanotube networks. Solid-State Electron. 2004;48:1753-6.
Oh et al., Organic molecules as mediators and catalysts for photocatalytic and electrocatalytic $CO_2$ reduction. Chem Soc Rev. 2013;42(6):2253-61.
Papakonstantinou et al., Fundamental electrochemical properties of carbon nanotube electrodes. Fullerenes Nanotubes Carb Nanostruct. 2005 Dep;13:91-108.
Pawlowski et al., Novel photoacid generators. Key components for the progress of chemically amplified photoresist systems. J Photopolymer Sci Tech. 1991;4(3):389-402.
Peltola et al., Carbon-Nanotube Transparent Electrodes for Flexible Displays. Info Displays. Feb. 2007;2-5.
Peng et al., Carbon Nanotube Chemical and Mechanical Sensors. Conference Paper for the 3rd International Workshop on Structural Health Monitoring. Stanford, CA. Sep. 12-14, 2001. 8 pages.
Petrov et al., Noncovalent functionalization of multi-walled carbon nanotubes by pyrene containing polymers. Chem Commun (Camb). Dec. 7, 2003;(23):2904-5.
Powell et al., A laboratory exercise introducing students to the Pourbaix diagram for cobalt. J Chem Educ. 1987;64(2):165-7.
Prosini et al., Electrochemical studies of hydrogen evolution, storage and oxidation on carbon nanotube electrodes. J Power Sources. 2003;118(1):265-9.
Rai et al., Dispersions of Functionalized Single-Walled Carbon Nanotubes in Strong Acids: Solubility and Rheology. J Nanosci Nanotech. 2007;7:3378-85.
Raudino et al., Modeling of low-temperature depolymerization of poly(methyl methacrylate) promoted by ion beam. J Chem Phys. Jul. 22, 1999;111(4):1721-31.
Rinzler et al., Large-scale purification of single-wall carbon nanotubes: process, product, and characterization. Appl Phys A. 1998;67:29-37.
Robinson et al., Improved chemical detection using single-walled carbon nanotube network capicitors. Sensors Actuators A. 2007;135:309-14.
Ryan et al., Novel sub-ceiling temperature rapid depolymerization-repolymerization reactions of cyanoacrylate polymers. Macromolec Rapid Comm. 1996;17:217-27.
Sakakibara et al., Near-infrared saturable absorption of single-wall carbon nanotubes prepared by laser ablation method. Jap J Appl Phys. 2003;42(5A):L494-6. Abstract.
Salzmann et al., Highly hydrophilic and stable polypeptide/single-wall carbon nanotube conjugates. J Mater Chem. 2008;18:1977-83.
Sreekumar et al., Single-Wall Carbon Nanotube Films. Chem Mater. 2003;15:175-8.
Urbonaite, Synthesis and characterisation of carbide derived carbons. Doctoral Thesis, Department of Physical, Inorganic and Structural Chemistry, Stockholm University. 2008:1-82.
Villalpando-Paez et al., Synthesis and characterization of long strands of nitrogen-doped single-walled carbon nanotubes. Chem Phys Lett. 2006;424:345-52.

(56) References Cited

OTHER PUBLICATIONS

Wagner et al., Change of electrochemical impedance spectra (EIS) with time during CO-poisoning of the Pt-anode in a membrane fuel cell. J Power Sources. 2004;127:341-7.

Wang et al., Light Scattering Study on SWNTs Solutions. American Physical Society. Annual APS Mar. Meeting 2003. Mar. 3-7, 2003. Meeting Session C1, Poster Session I. Abstract No. C1.014. 1 page.

Ward et al., A nonvolatile nanoelectromechanical memory element utilizing a fabric of carbon nanotubes. Non-Volatile Memory Technology Symposium. 2004;34-8. Abstract.

Winther-Jensen et al., Conducting polymer composite materials for hydrogen generation. Adv Mater. Apr. 18 2010;22(15):1727-30. doi: 10.1002/adma.200902934.

Wu et al., Green Power Source Material. Chemical Industry Publishing House. 2008: 268.

Wu et al., Transparent Conductive Carbon Nanotube Films. Science. Aug. 27, 2004;305:1273-6.

Xue et al., The preparation of highly water-soluble multi-walled carbon nanotubes by irreversible noncovalent functionalization with a pyrene-carrying polymer. Nanotech. May 28, 2008;19(21):215604. doi: 10.1088/0957-4484/19/21/215604. Epub Apr. 21, 2008.

Yamada et al., Toward Environmentally Friendly Photolithographic Materials: A New Class of Water-Soluble Photoresists. Macromolec. 2004;37(2):377-84.

Yang et al., Functionalization of multiwalled carbon nanotubes by pyrene-labeled hydroxypropyl cellulose. J Phys Chem B. Oct. 16, 2008;112(41):12934-9. doi: 10.1021/jp805424f. Epub Sep. 23, 2008.

Yang et al., Hydrogen generation using PPy-FMS modified PVDF membrane and other substrates. Synth Metals. 2005;154:69-72.

Yang et al., Preparation and characterization of water-soluble single-walled carbon nanotubes by hybridization with hydroxypropyl cellulose derivatives. Ind Eng Chem Res. 2010;49(6):2747-51.

Yuan et al., Electronic interactions and polymer effect in the functionalization and solvation of carbon nanotubes by pyrene-and ferrocene-containg poly(1-alkynes)s. Macromol. Feb. 2008;41(3):701-7.

Yuan et al., Property Control of Single Walled Carbon Nanotubes and Their Devices. Dissertation. Department of Chemistry, Duke University. Dec. 2008. 167 pages.

Zhang et al., Microwave-assisted synthesis of Pt/CNT nanocomposite electrocatalysts for PEM fuel cells. Nanoscale. Feb. 2010;2(2):282-6. doi: 10.1039/b9nr00140a. Epub Oct. 12, 2009.

Extended European Search Report dated May 26, 2017 for Application No. EP 14864890.0.

\* cited by examiner

FIG. 1A
Cell top view

FIG. 1B
Cell side view

CARBON DIOXIDE REDUCTION OVER CARBON-CONTAINING MATERIALS

RELATED APPLICATIONS

This application is a 35 U.S.C. § 371 National Phase filing of International Application No. PCT/US2014/066714, filed on Nov. 20, 2014 and entitled "Carbon Dioxide Reduction Over Carbon-Containing Materials," claims the benefit under 35 U.S.C. § 119(e) of U.S. Provisional Application Ser. No. 61/906,616, filed Nov. 20, 2013, and entitled "Carbon Dioxide Reduction over Single Wall Carbon Nanotubes," the contents of which are incorporated herein by reference in their entirety for all purposes.

FIELD

Embodiments described herein generally relate to layered, carbon-containing materials for use in reducing carbon dioxide, and associated systems and methods.

BACKGROUND

Man-made carbon dioxide ($CO_2$) emissions have increased dramatically in the last 100 years as a result of the ever expanding demand for fossil fuels. At the beginning of the $20^{th}$ century, annual global oil consumption was about 150 million barrels. Today that amount is consumed in less than two days. Similarly, since 1985 global use of coal has more than doubled, going from about 70 quadrillion BTU annually to over 150 quadrillion BTU today. Advances in the global thermal data record and in the climate models have demonstrated accelerated warming. In 2007, the Intergovernmental Panel on Climate Change (IPCC) concluded that undeniable global warming was very likely man-made (95% confidence), laying much of the blame on the increase in global $CO_2$ emissions from fossil fuels. Moreover, carbon dioxide emissions are projected to increase in coming decades due to economic and population growth around the world.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to carbon dioxide reduction with electrodes comprising layered, carbon-containing materials (e.g., single wall carbon nanotube films). Carbon-based fuels have advantages that make them difficult to replace. The greatest of these is perhaps the enormous existing infrastructure for their distribution and use. Carbon-based fuels also possess a high energy density compared to other fuels. Accordingly, there is little incentive to find alternatives. In light of this reality, catalytic conversion of the waste $CO_2$ back to a usable fuel and/or commodity chemicals using renewable (solar, wind, wave) or deep (nuclear) energy sources have been considered to reduce $CO_2$ levels. Wholesale catalytic conversion of $CO_2$ would impact the global carbon balance by recycling the $CO_2$ into useful fuels, making the corresponding rewards (stabilization of global $CO_2$ and temperatures) enormous.

Only a few precious metal catalysts exhibit high catalytic conversion of $CO_2$ at low overpotential. The overpotential is defined as the voltage beyond the thermodynamic minimum voltage for the reaction to proceed for the catalyst. For example, a silver catalyst has demonstrated $CO_2$ reduction at a low overpotential of −0.17 V in an ionic liquid medium. Similarly, a hydrogenated palladium (Pd) electrode showed $CO_2$ reduction at an overpotential of −0.20 V in the presence of pyridinium within the electrolyte. However, no non-precious metal catalysts have exhibited $CO_2$ reduction at such low overpotentials. Among the best non-precious metal catalysts is iron 5,10,15,20-tetrakis(2,6-dihydroxylphenyl)-porphyrin (Fe TDHPP), which has exhibited a $CO_2$ reduction at an overpotential of −0.43 V. Ni-cyclam and Mn-based carbonyl complexes showed efficient $CO_2$ reduction in acetonitrile at overpotentials of −0.55 V and −0.51 V, respectively. Some copper and zinc oxide based electrodes have shown carbon dioxide reduction activity in aqueous electrolyte within an overpotential range of −0.3 V to −0.7 V.

In the present disclosure, electrochemical reduction of $CO_2$ over layered, carbon-containing materials, such as single wall carbon nanotube films, is demonstrated at remarkably low overpotentials. Examples of suitable layered, carbon-containing materials include, but are not limited to, carbon nanotubes (e.g., single wall carbon nanotubes, multi-wall carbon nanotubes), carbon-carbon compacts (e.g., composites comprising carbon particles and a carbonized polymer binder), carbon nanofibers (e.g., stacked cup carbon nanofibers), multilayer graphene films (e.g., double-layer graphene, triple-layer graphene), reduced graphene oxide, pyrolytic graphite (e.g., highly ordered pyrolytic graphite), and microcrystalline graphite (e.g., amorphous graphite).

It has been recognized within the context of this invention that certain carbon-containing materials are capable of catalyzing $CO_2$ reduction at low overpotentials. In some embodiments, the carbon-containing material comprises a plurality of $sp^2$ bonded carbon atoms. A material comprising a plurality of $sp^2$ bonded carbon atoms may, in some cases, be referred to as an $sp^2$ bonded carbon material. In some embodiments, the percentage of carbon atoms in an $sp^2$ bonded carbon material that are $sp^2$ bonded is at least about 50%, at least about 60%, at least about 70%, at least about 80%, at least about 90%, at least about 95%, at least about 99%, or about 100%. In certain cases, the percentage of carbon atoms in an $sp^2$ bonded carbon material that are $sp^2$ bonded is in the range of about 50% to about 100%, about 60% to about 100%, about 70% to about 100%, about 80% to about 100%, about 90% to about 100%, about 95% to about 100%, or about 99% to about 100%. In some embodiments, an $sp^2$ bonded carbon material comprises one or more aromatic rings (e.g., a network of aromatic rings) comprising at least a portion of the $sp^2$ bonded carbon atoms.

In some embodiments, the carbon-containing material has a relatively high percentage of carbon. In certain cases, the atomic percent of carbon in the carbon-containing material (e.g., the percent ratio of the number of carbon atoms to the total number of atoms) is at least about 50%, at least about 60%, at least about 70%, at least about 80%, at least about 90%, at least about 95%, or at least about 99%. The atomic percent of carbon in the carbon-containing material is, in some cases, in the range of about 50% to about 99%, about 60% to about 99%, about 70% to about 99%, about 80% to about 99%, about 90% to about 99%, or about 95% to about 99%. In certain embodiments, the carbon-containing material is substantially free of heteroatoms. In some cases, the carbon-containing material comprises one or more heteroatoms. As used herein, a heteroatom refers to an atom that is not carbon or hydrogen (e.g., oxygen, nitrogen).

In some embodiments, the carbon-containing material has a relatively high electrical conductivity. In certain cases, for example, delocalized pi electrons from one or more aromatic rings (e.g., a network of aromatic rings) facilitate charge transport throughout the carbon-containing material. Accordingly, in some cases, the carbon-containing material has a relatively low resistance. In some embodiments, the carbon-containing material has a sheet resistance of about 1000 ohms/sq or less, about 500 ohms/sq or less, about 200 ohms/sq or less, about 100 ohms/sq or less, about 50 ohms/sq or less, about 20 ohms/sq or less, or about 10 ohms/sq or less. In some embodiments, the carbon-containing material has a sheet resistance in the range of about 10 ohms/sq to about 20 ohms/sq, about 10 ohms/sq to about 50 ohms/sq, about 10 ohms/sq to about 100 ohms/sq, about 10 ohms/sq to about 200 ohms/sq, about 10 ohms/sq to about 500 ohms/sq, or about 10 ohms/sq to about 1000 ohms/sq. Sheet resistance may be measured according to any method known in the art. For example, sheet resistance may be measured using a four-point probe.

In some embodiments, the carbon-containing material comprises a plurality of discontinuous, electrically conductive structures in electrical communication with each other. For example, in certain embodiments, the carbon-containing material may comprise a plurality of electrically conductive carbon nanotubes and/or electrically conductive carbon particles (e.g., graphitic particles). The plurality of discontinuous, electrically conductive structures may, in some cases, comprise $sp^2$ bonded carbons. In some embodiments, the plurality of electrically conductive structures may be arranged such that charge is able to propagate through the carbon-containing material (e.g., the electrically conductive structures may form an electrically conductive network).

It has also been recognized within the context of this invention that a carbon-containing material having a layered structure may be capable of catalyzing $CO_2$ reduction at low overpotentials. As used herein, a layered structure refers to a structure comprising a plurality of layers (e.g., sheets), where at least a portion of one layer is separated from at least a portion of an adjacent layer by a finite space. In some cases, a layer may comprise an amount of a material (e.g., a carbon-containing material) bounded by a space (e.g., a finite space) or other boundary. A layer of the layered structure may, in some cases, be substantially continuous. In some embodiments, a layer of the layered structure may comprise a plurality of individual, discontinuous structures (e.g., carbon nanotubes). A layer may have any suitable shape. For example, a layer of the layered structure may be substantially planar, substantially cylindrical, substantially spherical, or irregularly shaped. A layer may, in some cases, comprise one or more protrusions. According to some embodiments, a layered structure may comprise one or more bundles of carbon nanotubes (e.g., SWNTs).

The layered, carbon-containing material may have any suitable structure. In some cases, the layered structure comprises a plurality of substantially parallel layers. In some embodiments, at least two adjacent layers are held together by van der Waals forces. In some embodiments, at least two adjacent layers are held together by at least one covalent bond, at least one ionic bond, and/or at least one hydrogen bond.

According to some embodiments, the space between at least two adjacent layers may be sufficiently large for one or more ions (e.g., anions, cations) and/or one or more neutral molecules to be intercalated between the two layers. The one or more ions may be monatomic or polyatomic. In certain cases, the one or more ions and/or neutral molecules may comprise one or more heteroatoms. In some embodiments, the space between at least two adjacent layers is at least about 0.1 nm, at least about 0.5 nm, at least about 1 nm, at least about 2 nm, at least about 5 nm, or at least about 10 nm. In some embodiments, the space between at least two adjacent layers is in the range of about 0.1 nm to about 0.5 nm, about 0.1 nm to about 1 nm, about 0.1 nm to about 2 nm, about 0.1 nm to about 5 nm, about 0.1 nm to about 10 nm, about 0.5 nm to about 1 nm, about 0.5 nm to about 2 nm, about 0.5 nm to about 5 nm, about 0.5 nm to about 10 nm, about 1 nm to about 2 nm, about 1 nm to about 5 nm, about 1 nm to about 10 nm, or about 5 nm to about 10 nm.

In some embodiments, the layered, carbon-containing material comprises a plurality of carbon nanotubes (CNTs). A carbon nanotube (CNT) generally refers to a substantially cylindrical nanostructure comprising a layer of graphene. In some embodiments, a CNT may be a single wall carbon nanotube (e.g., a CNT comprising a single layer of graphene). In alternative embodiments, a CNT may be a multiwall carbon nanotube (e.g., a CNT comprising two or more layers of graphene). In some embodiments, the percentage of CNTs in the carbon-containing material that are SWNTs is relatively high. For example, the percentage of CNTs in the carbon-containing material that are SWNTs may be at least about 50%, at least about 60%, at least about 70%, at least about 80%, at least about 90%, at least about 95%, at least about 99%, or about 100%. In certain cases, the percentage of CNTs in the carbon-containing material that are SWNTs is in the range of about 50% to about 100%, about 60% to about 100%, about 70% to about 100%, about 80% to about 100%, about 90% to about 100%, about 95% to about 100%, or about 99% to about 100%.

In some embodiments, two or more CNTs may associate with each other and form a bundle. The CNTs in a bundle may be held together by van der Waals forces. In some cases, a CNT bundle comprises at least about 2 CNTs, at least about 5 CNTs, at least about 10 CNTs, at least about 30 CNTs, at least about 50 CNTs, at least about 70 CNTs, at least about 100 CNTs, at least about 200 CNTs, at least about 500 CNTs, at least about 700 CNTs, or at least about 1000 CNTs. In some embodiments, a CNT bundle has a diameter of at least about 5 nm, at least about 10 nm, at least about 20 nm, at least about 50 nm, or at least about 100 nm, at least about 200 nm, or at least about 500 nm. A layered, carbon-containing material may, in some cases, comprise one or more CNT bundles. In some cases, at least two CNT bundles of the layered, carbon-containing material are held together by van der Waals forces.

The layered, carbon-containing material comprising a plurality of CNTs (e.g., SWNTs) may, in certain embodiments, exhibit a relatively high electrical conductivity. In some embodiments, at least a portion of the CNTs in the layered, carbon-containing material are electrically conductive. For example, at least a portion of the CNTs may be metallic nanotubes or semiconducting nanotubes doped with a charge transfer species (e.g., bromine, iodine, alkali metals). According to some embodiments, the electrically conductive CNTs may be in electrical communication, such that charge may be transported throughout the layered, carbon-containing material.

In some cases, the CNTs of the layered, carbon-containing material have relatively small diameters. In certain embodiments, at least a portion of the CNTs have a diameter of about 100 nm or less, about 50 nm or less, about 20 nm or less, about 10 nm or less, about 5 nm or less, about 2 nm or less, or about 1 nm or less. In some embodiments, at least a portion of the CNTs have a diameter in the range of about 1 nm to about 2 nm, about 1 nm to about 5 nm, about 1 nm to about 10 nm, about 1 nm to about 20 nm, about 1 nm to about 50 nm, or about 1 nm to about 100 nm. In some embodiments, the number average diameter of the CNTs in the layered, carbon-containing material is in the range of about 1 nm to about 2 nm, about 1 nm to about 5 nm, about 1 nm to about 10 nm, about 1 nm to about 20 nm, about 1 nm to about 50 nm, or about 1 nm to about 100 nm. In certain cases, substantially all of the CNTs in the layered, carbon-containing material have a diameter in the range of about 1 nm to about 2 nm, about 1 nm to about 5 nm, about 1 nm to about 10 nm, about 1 nm to about 20 nm, about 1 nm to about 50 nm, or about 1 nm to about 100 nm.

The CNTs described herein may be described according to any method known in the art. Non-limiting examples of suitable methods include chemical vapor deposition, laser ablation, and thermal plasma methods.

In some embodiments, the layered, carbon-containing material comprises a carbon-carbon compact. As used herein, a carbon-carbon compact refers to a composite comprising a plurality of carbon particles (e.g., graphitic particles) and a carbonized polymer binder. For example, a carbon-carbon compact may be formed by pyrolyzing a plurality of carbon particles in a polymer binder (e.g., subjecting the carbon particles and polymer binder to a temperature of at least about 1000° C. under an inert atmosphere), such that the polymer binder is carbonized. In some embodiments, the carbon particles comprise a plurality of $sp^2$ bonded carbons. For example, the carbon particles may, in some cases, be graphitic particles (e.g., particles comprising one or more graphene sheets). In some embodiments, the carbon particles may be relatively small. For example, the carbon particles may have a number average maximum cross-sectional dimension of about 50 µm or less, about 20 µm or less, about 10 µm or less, about 5 µm or less, about 1 µm or less, about 500 nm or less, about 200 nm or less, about 100 nm or less, about 50 nm or less, about 20 nm or less. In some embodiments, the carbon particles may have a number average maximum cross-sectional dimension in the range of about 20 nm to about 50 nm, about 20 nm to about 100 nm, about 20 nm to about 200 nm, about 20 nm to about 500 nm, about 20 nm to about 1 µm, about 20 nm to about 5 µm, about 20 nm to about 10 µm, about 20 nm to about 20 µm, or about 20 nm to about 50 µm. As used herein, the maximum cross-sectional dimension of a particle refers to the largest distance between two opposed boundaries of the particle that may be measured (e.g., diameter). The carbon particles may have any suitable shape. For example, at least a portion of the carbon particles may be substantially spherical, substantially flake-shaped, substantially needle-shaped, irregularly shaped, or any other shape.

In some embodiments, the carbon particles are embedded in a polymer prior to pyrolysis. The polymer may be any polymer consisting of carbon, hydrogen, and oxygen that is capable of being carbonized. Examples of suitable polymers include, but are not limited to, poly(furfuryl alcohol), polyethylene, poly(methyl methacrylate), phenolic resins, and graphite cement. In some cases, polymers comprising elements other than carbon, hydrogen, and oxygen may be used. Non-limiting examples of suitable polymers include polyaniline, polypyrrole, and polythiophene. The polymer may be selected such that after carbonization, the carbon-carbon compact has relatively high electrical conductivity.

In some embodiments, at least a portion of the plurality of carbon particles are electrically conductive. In some cases, a plurality of the electrically conductive carbon particles are in electrical communication with each other. For example, the plurality of carbon particles may form a network facilitating charge transport throughout the carbon-carbon compact.

In some embodiments, the layered, carbon-containing material comprises a plurality of carbon nanofibers. A carbon nanofiber generally refers to a carbon nanostructure comprising graphene layers arranged as stacked cones, cups, and/or plates. In some embodiments, the carbon nanofiber is substantially tubular. In some embodiments, at least a portion of the carbon nanofibers have a diameter of at least about 10 nm, at least about 20 nm, at least about 50 nm, at least about 70 nm, at least about 100 nm, at least about 150 nm, at least about 200 nm, at least about 500 nm, at least about 700 nm, or at least about 1 µm. In some embodiments, at least a portion of the plurality of carbon nanofibers have a diameter in the range of about 10 nm to about 20 nm, about 10 nm to about 50 nm, about 10 nm to about 70 nm, about 10 nm to about 100 nm, about 10 nm to about 150 nm, about 10 nm to about 200 nm, about 10 nm to about 500 nm, about 10 nm to about 700 nm, about 10 nm to about 1 µm, about 50 nm to about 100 nm, about 50 nm to about 150 nm, about 50 nm to about 200 nm, about 50 nm to about 500 nm, about 50 nm to about 700 nm, about 50 nm to about 1 µm, about 100 nm to about 200 nm, about 100 nm to about 500 nm, about 100 nm to about 700 nm, or about 100 nm to about 1 µm. In some embodiments, the number average diameter of the carbon nanofibers in the layered, carbon-containing material is in the range of about 10 nm to about 20 nm, about 10 nm to about 50 nm, about 10 nm to about 70 nm, about 10 nm to about 100 nm, about 10 nm to about 150 nm, about 10 nm to about 200 nm, about 10 nm to about 500 nm, about 10 nm to about 700 nm, about 10 nm to about 1 µm, about 50 nm to about 100 nm, about 50 nm to about 150 nm, about 50 nm to about 200 nm, about 50 nm to about 500 nm, about 50 nm to about 700 nm, about 50 nm to about 1 µm, about 100 nm to about 200 nm, about 100 nm to about 500 nm, about 100 nm to about 700 nm, or about 100 nm to about 1 µm.

The carbon nanofibers described herein may be described according to any method known in the art. Non-limiting examples of suitable methods include chemical vapor deposition, laser ablation, and thermal plasma methods.

As used herein, the term "graphene" is given its ordinary meaning in the art and generally refers to a single atomic layer of carbon atoms that are covalently bound to each other (e.g., sp$^2$ bonded carbons). The sp$^2$ bonded carbons form repeating units that generally comprise 6-membered rings. In some cases, a graphene layer comprises a basal plane comprising a fused network of aromatic rings and a perimeter or edge comprising the terminal carbon atoms of the fused network. The basal plane may, in some cases, be flat or buckled. As used herein, the term "graphite" refers to two or more layers of graphene.

The layered, carbon-containing materials described herein may be synthesized according to any method known in the art. For example, fabrication of SWNT thin films on filtration membranes is described in U.S. Pat. No. 7,261,852, issued on Aug. 28, 2007, which is hereby incorporated by reference in its entirety. Briefly, SWNTs in a homogeneous surfactant suspension are vacuum or pressure filtered to the surface of a filtration membrane. The pores of the filtration membrane are too small for the SWNTs to efficiently permeate (typically about 0.1 μm-0.22 μm), resulting in the nanotubes assembling as a thin film on the top surface of the membrane. In some embodiments, the filtration membrane makes up part of the completed device.

In addition, the filtration membrane may be lyophobic to prevent leakage of the electrolyte from the cell volume. The permeation of water through the lyophobic membrane during assembly of the SWNT film can be facilitated by excess surfactant in the aqueous SWNT surfactant suspension. The surfactant may subsequently be washed out of the SWNT film and the filtration membrane by washing with a solvent in which the surfactant is highly soluble. The SWNT film may then permitted to dry, consolidating the SWNTs as a continuous, electrically conducting film. Non-limiting examples of lyophobic membranes include polytetrafluoroethylene (PTFE, trade name Teflon) and hydrophobic modified polyamides (trade name hydrophobic modified Nylon). In some embodiments of the invention, the porous membrane can be constructed of a hydrophobic polymer, for example, tetrafluoroethylene (PTFE), polyvinylidene fluoride (PVDF), polyethylene, polypropylene, polyester, or hydrophobic polyamide. In other embodiments of the invention, the porous membrane can be a polymer generally considered hydrophilic, where the surface has been treated to achieve a hydrophobic surface. A metal may be evaporated along one edge of the SWNT film with sufficient overlap to make electrical contact to the nanotubes. The electrode may then be used.

In some embodiments, an electrode comprises a carbon-containing material described herein. The carbon-containing material may, in some cases, be an sp$^2$ bonded carbon material. An electrode comprising an sp$^2$ bonded carbon material may be referred to as an sp$^2$ bonded carbon electrode. In some embodiments, the electrode comprises a single layer of the carbon-containing material (e.g., sp$^2$ bonded carbon material). In some cases, the electrode comprises a plurality of layers of the carbon-containing material (e.g., the electrode comprises a layered, carbon-containing material).

In certain embodiments, the electrode comprises a layered, carbon-containing material having the form of a foam and/or a felt. Accordingly, the electrode may comprise a plurality of pores (e.g., conduits, voids, passageways). In some embodiments, the electrode has a porosity of at least about 10% by volume, at least about 20% by volume, at least about 30% by volume, at least about 40% by volume, at least about 50% by volume, at least about 60% by volume, at least about 70% by volume, at least about 80% by volume or at least about 90% by volume. In some cases, the porosity of the electrode is in the range of about 10% to about 20% by volume, about 10% to about 30% by volume, about 10% to about 40% by volume, about 10% to about 50% by volume, about 10% to about 60% by volume, about 10% to about 70% by volume, about 10% to about 80% by volume, about 10% to about 90% by volume, about 20% to about 30% by volume, about 20% to about 40% by volume, about 20% to about 50% by volume, about 20% to about 60% by volume, about 20% to about 70% by volume, about 20% to about 80% by volume, about 20% to about 90% by volume, about 40% to about 50% by volume, about 40% to about 60% by volume, about 40% to about 70% by volume, about 40% to about 80% by volume, about 40% to about 90% by volume, about 60% to about 70% by volume, about 60% to about 80% by volume, or about 60% to about 90% by volume.

In some embodiments, the average pore size (e.g., number average maximum cross-sectional dimension) of the plurality of pores of the electrode is relatively large. For example, the average pore size may be at least about 1 μm, at least about 2 μm, at least about 5 μm, at least about 10 μm, at least about 20 μm, at least about 50 μm, at least about 100 μm, at least about 200 μm, at least about 500 μm, at least about 1 mm, at least about 2 mm, or at least about 5 mm. In some embodiments, the average pore size is in the range of about 1 μm to about 2 μm, about 1 μm to about 5 μm, about 1 μm to about 10 μm, about 1 μm to about 20 μm, about 1 μm to about 50 μm, about 1 μm to about 100 μm, about 1 μm to about 200 μm, about 1 μm to about 500 μm, about 1 μm to about 1 mm, about 1 μm to about 2 mm, about 1 μm to about 5 mm, about 10 μm to about 20 μm, about 10 μm to about 50 μm, about 10 μm to about 100 μm, about 10 μm to about 200 μm, about 10 μm to about 500 μm, about 10 μm to about 1 mm, about 10 μm to about 2 mm, about 10 μm to about 5 mm, about 100 μm to about 200 μm, about 100 μm to about 500 μm, about 100 μm to about 1 mm, about 100 μm to about 2 mm, about 100 μm to about 5 mm, about 1 mm to about 2 mm, or about 1 mm to about 5 mm. The pores may have any suitable shape. For example, at least a portion of the pores may have a substantially circular, substantially elliptical, substantially polygonal, or irregular cross section.

In some cases, an electrode comprising a layered, carbon-containing material has a relatively large surface area. As used herein, the term "surface area" refers to bulk surface area (e.g., the area of all surfaces of the electrode that a fluid, such as a liquid electrolyte, may be able to contact). In some embodiments, the electrode has a surface area of at least about 100 m$^2$/g, at least about 200 m$^2$/g, at least about 500 m$^2$/g, at least about 700 m$^2$/g, or at least about 1000 m$^2$/g. In some embodiments, the electrode has a surface area in the range of about 100 m$^2$/g to about 200 m$^2$/g, about 100 m$^2$/g to about 500 m$^2$/g, about 100 m$^2$/g to about 700 m$^2$/g, about 100 m$^2$/g to about 1000 m$^2$/g, about 200 m$^2$/g to about 500 m$^2$/g, about 200 m$^2$/g to about 700 m$^2$/g, about 200 m$^2$/g to about 1000 m$^2$/g, or about 500 m$^2$/g to about 1000 m$^2$/g.

In certain embodiments, the electrode comprising a layered, carbon-containing material has a relatively low density. In some cases, the density of the electrode is about 5 g/cm$^3$ or less, about 2 g/cm$^3$ or less, about 1 g/cm$^3$ or less, about 0.5 g/cm$^3$ or less, about 0.2 g/cm$^3$ or less, or about 0.1 g/cm$^3$ or less. In some embodiments, the density of the electrode is in the range of about 0.1 g/cm$^3$ to about 0.2 g/cm³, 0.1 g/cm³ to about 0.5 g/cm³, 0.1 g/cm³ to about 1 g/cm³, 0.1 g/cm³ to about 2 g/cm³, or about 0.1 g/cm³ to about 5 g/cm³.

According to some embodiments, an electrode comprising a layered, carbon-containing material may be used to electrochemically reduce carbon dioxide. In some embodiments, $CO_2$ reduction may initiate at a relatively low overpotential. In certain cases, $CO_2$ reduction may initiate at an overpotential of about 1 V or less, about 0.7 V or less, about 0.5 V or less, about 0.2 V or less, about 0.1 V or less, about 0.05 V or less, or about 0.01 V or less. In some embodiments, $CO_2$ reduction may initiate at an overpotential in the range of about 0.01 V to about 0.05 V, about 0.01 V to about 0.1 V, about 0.01 V to about 0.2 V, about 0.01 V to about 0.5 V, about 0.01 V to about 0.7 V, about 0.01 V to about 1 V, about 0.05 V to about 0.1 V, about 0.05 V to about 0.2 V, about 0.05 V to about 0.5 V, about 0.05 V to about 0.7 V, about 0.05 V to about 1 V, about 0.1 V to about 0.5 V, about 0.1 V to about 0.7 V, about 0.1 V to about 1 V, about 0.2 V to about 0.5 V, about 0.2 V to about 0.7 V, about 0.2 V to about 1 V, or about 0.5 V to about 1 V.

The electrode may have any suitable thickness. In some embodiments, the electrode has a thickness of about 5000 μm or less, about 2000 μm or less, about 1000 μm or less, about 500 μm or less, about 200 μm or less, about 100 μm or less, about 50 μm or less, about 20 μm or less, about 10 μm or less, about 5 μm or less, about 2 μm or less, about 1.5 μm or less, about 1 μm or less, about 500 nm or less, about 100 nm or less, about 50 nm or less, about 20 nm or less, or about 10 nm or less. In some embodiments, the electrode has a thickness in the range of about 10 nm to about 20 nm, about 10 nm to about 50 nm, about 10 nm to about 100 nm, about 10 nm to about 500 nm, about 10 nm to about 1 μm, about 10 nm to about 1.5 μm, about 10 nm to about 2 μm, about 10 nm to about 5 μm, about 10 nm to about 10 μm, about 10 nm to about 20 μm, about 10 nm to about 50 μm, about 10 nm to about 100 μm, about 10 nm to about 200 μm, about 10 nm to about 500 μm, about 10 nm to about 1000 μm, about 10 nm to about 2000 μm, about 10 nm to about 5000 μm, about 50 nm to about 100 nm, about 50 nm to about 500 nm, about 50 nm to about 1 μm, about 50 nm to about 1.5 μm, about 50 nm to about 2 μm, about 50 nm to about 5 μm, about 50 nm to about 10 μm, about 50 nm to about 20 μm, about 50 nm to about 50 μm, about 50 nm to about 100 μm, about 50 nm to about 200 μm, about 50 nm to about 500 μm, about 50 nm to about 1000 μm, about 50 nm to about 2000 μm, about 50 nm to about 5000 μm, about 100 nm to about 500 nm, about 100 nm to about 1 μm, about 100 nm to about 1.5 μm, about 100 nm to about 2 μm, about 100 nm to about 5 μm, about 100 nm to about 10 μm, about 100 nm to about 20 μm, about 100 nm to about 50 μm, about 100 nm to about 100 μm, about 100 nm to about 200 μm, about 100 nm to about 500 μm, about 100 nm to about 1000 μm, about 100 nm to about 2000 μm, about 100 nm to about 5000 μm, about 500 nm to about 1 μm, about 500 nm to about 1.5 μm, about 500 nm to about 2 μm, about 500 nm to about 5 μm, about 500 nm to about 10 μm, about 500 nm to about 20 μm, about 500 nm to about 50 μm, about 500 nm to about 100 μm, about 500 nm to about 200 μm, about 500 nm to about 500 μm, about 500 nm to about 1000 μm, about 500 nm to about 2000 μm, about 500 nm to about 5000 μm, about 1 μm to about 2 μm, about 1 μm to about 5 μm, about 1 μm to about 10 μm, about 1 μm to about 20 μm, about 1 μm to about 50 μm, about 1 μm to about 100 μm, about 1 μm to about 200 μm, about 1 μm to about 500 μm, about 1 μm to about 1000 μm, about 1 μm to about 2000 μm, about 1 μm to about 5000 μm, about 10 μm to about 20 μm, about 10 μm to about 50 μm, about 10 μm to about 100 μm, about 10 μm to about 200 μm, about 10 μm to about 500 μm, about 10 μm to about 1000 μm, about 10 μm to about 2000 μm, about 10 μm to about 5000 μm, about 100 μm to about 200 μm, about 100 μm to about 500 μm, about 100 μm to about 1000 μm, about 100 μm to about 2000 μm, about 100 μm to about 5000 μm, about 1000 μm to about 2000 μm, or about 1000 μm to about 5000 μm.

In some embodiments, the electrode may be used in a device (e.g., a $CO_2$ reduction cell) designed to catalyze $CO_2$ electroreduction. The $CO_2$ reduction cell may, in some embodiments, comprise a working electrode comprising a layered, carbon-containing material (e.g., SWNTs), a counter electrode, and an electrolyte. The counter electrode may comprise any electrically conductive material. Examples of suitable materials for the counter electrode include, but are not limited to, platinum (Pt), palladium (Pd), nickel (Ni), stainless steel, glassy carbon, and semiconducting oxides. In certain embodiments, the counter electrode may catalyze oxygen evolution. In some embodiments, the electrolyte may be positioned between the working electrode and the counter electrode. In certain embodiments, the electrolyte may be in direct contact with the working electrode. According to some embodiments, the electrolyte may comprise dissolved $CO_2$. The electrolyte may be a liquid electrolyte or a solid electrolyte. In cases where the electrolyte is a liquid electrolyte, the $CO_2$ reduction cell may comprise a three-phase interface where the solid working electrode, liquid electrolyte, and gaseous $CO_2$ meet. In some embodiments, the three-phase interface may have a relatively large surface area.

In some embodiments, the $CO_2$ reduction cell further comprises a separator positioned between the working electrode and the counter electrode. In some cases, the separator is positioned between a first chamber comprising the working electrode and a second, separate chamber comprising the counter electrode. In some embodiments, the first chamber may comprise a first electrolyte, and the second chamber may comprise a second electrolyte. The first and second electrolytes may be the same or different. The separator may, in some cases, permit transport of certain ions (e.g., electrolyte ions). In some cases, the separator inhibits transport of reaction products. One of ordinary skill in the art would be able to select an appropriate separator material.

The $CO_2$ reduction cell may, in some embodiments, comprise a porous membrane. According to some embodiments, the porous membrane comprises a first side and a second side opposite the first side. In some cases, a carbon-containing material (e.g., a layered, carbon-containing material) is disposed on the first side of the porous membrane. In some cases, the second side comprises a lyophobic and/or hydrophobic material. In some cases, $CO_2$ may diffuse through the porous membrane.

According to some embodiments, the $CO_2$ reduction cell further comprises a power supply (e.g., a battery). In some cases, the power supply is connected to the working electrode by a contact electrode. For example, the contact electrode may overlap a portion of the working electrode. The contact electrode may comprise any electrically conductive material. Non-limiting examples of suitable materials for the contact electrode include Pt, Pd, Ni, stainless steel, glassy carbon, and semiconducting oxides.

In operation, the power supply may, optionally, provide power (e.g., apply voltage) to the working electrode. In some embodiments, the working electrode has a relatively high specific capacitance. For example, in some cases, the working electrode has a specific capacitance of at least about 1 F/g, at least about 5 F/g, at least about 10 F/g, at least about 50 F/g, at least about 100 F/g, at least about 200 F/g, at least about 300 F/g, at least about 400 F/g, at least about 500 F/g, at least about 600 F/g, at least about 700 F/g, at least about 800 F/g, at least about 900 F/g, or at least about 1000 F/g. In some embodiments, the working electrode has a specific capacitance in the range of about 1 F/g to about 5 F/g, about 1 F/g to about 10 F/g, about 1 F/g to about 50 F/g, about 1 F/g to about 100 F/g, about 1 F/g to about 200 F/g, about 1 F/g to about 300 F/g, about 1 F/g to about 400 F/g, about 1 F/g to about 500 F/g, about 1 F/g to about 600 F/g, about 1 F/g to about 700 F/g, about 1 F/g to about 800 F/g, about 1 F/g to about 900 F/g, about 1 F/g to about 1000 F/g, about 10 F/g to about 50 F/g, about 10 F/g to about 100 F/g, about 10 F/g to about 200 F/g, about 10 F/g to about 300 F/g, about 10 F/g to about 400 F/g, about 10 F/g to about 500 F/g, about 10 F/g to about 600 F/g, about 10 F/g to about 700 F/g, about 10 F/g to about 800 F/g, about 10 F/g to about 900 F/g, about 10 F/g to about 1000 F/g, about 100 F/g to about 200 F/g, about 100 F/g to about 300 F/g, about 100 F/g to about 400 F/g, about 100 F/g to about 500 F/g, about 100 F/g to about 600 F/g, about 100 F/g to about 700 F/g, about 100 F/g to about 800 F/g, about 100 F/g to about 900 F/g, about 100 F/g to about 1000 F/g, or about 500 F/g to about 1000 F/g. Specific capacitance may be obtained according to any method known in the art. For example, specific capacitance may be calculated from measurements made using cyclic voltammetry.

In some embodiments, the working electrode may come into contact with at least a portion of dissolved $CO_2$ in the electrolyte. Upon contact with the layered, carbon-containing material of the working electrode, the $CO_2$ may be reduced to one or more products. Non-limiting examples of reaction products include formate, carbon monoxide, methanol, ethanol, methane, ethane, acetic acid, formaldehyde, and acetaldehyde. In some embodiments, the one or more reaction products may be gases and/or liquids. The reaction products may, in some cases, be collected and stored for later use. In some embodiments, a $CO_2$ reduction current is generated.

Some aspects are directed to methods of reducing carbon dioxide. According to some embodiments, a method may comprise the step of providing an electrolyte including dissolved $CO_2$ to an electrode (e.g., an $sp^2$ bonded carbon electrode). In some embodiments, the method further comprises reducing the dissolved $CO_2$ via electroreduction. The reducing step may, for example, occur through powering the electrode. In some cases, the electrode may be powered by applying voltage from a power supply to the electrode (e.g., through a contact electrode in electrical communication with the power supply and the electrode).

The method may, optionally, comprise the step of mixing $CO_2$ with the electrolyte to produce the electrolyte including dissolved $CO_2$. In some cases, the $CO_2$ may be remotely mixed with the electrolyte. In certain embodiments, the $CO_2$ may diffuse through a membrane (e.g., a lyophobic, porous membrane) to mix with the electrolyte.

Figure 1A:
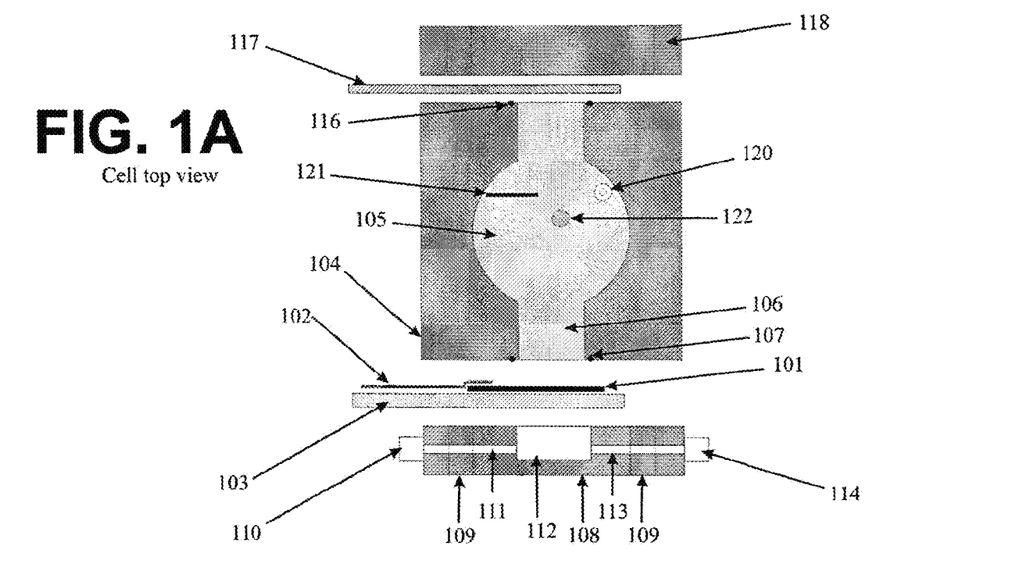
FIGS. 1A and 1B are graphical representations of an example of a cell used for carbon dioxide reduction with single wall carbon nanotubes in accordance with various embodiments of the present disclosure.
Figure 1B:
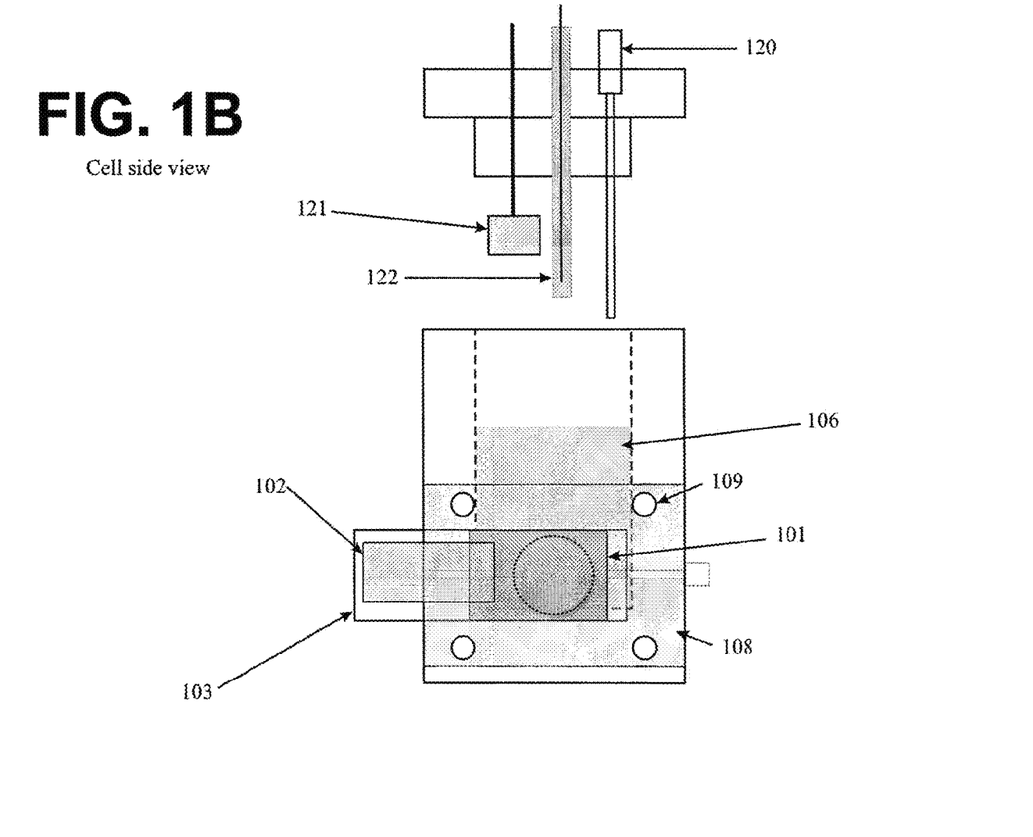

FIGS. 1A and 1B show exemplary schematic illustrations of a cell designed for $CO_2$ reduction, according to certain embodiments. Referring to FIGS. 1A and 1B, shown are top and side views (respectively) of an example of a metal electrode contacted SWNT film on a porous membrane and a cell, which was used in testing. The cell is described in PCT Application No. PCT/US2010/031995 filed on Apr. 22, 2010, which is hereby incorporated by reference in its entirety. In the example of FIGS. 1A and 1B, the SWNT film 101 is disposed on the underlying, lyophobic, porous membrane 103. A contact electrode 102 overlaps a portion of an edge of the SWNT film 101. The cell body 104, including an electrolyte volume (or chamber) 105 which holds the electrolyte, may be fabricated from, e.g., solid Teflon or other appropriate material. The electrolyte volume 105 has an opening 106 extending through the cell sidewall.

A seal such as, e.g., a captured O-ring 107, surrounds the sidewall opening 106 in the cell body 104. The seal is formed against the SWNT film 101 when the membrane 103 supporting the SWNT film 101 is pressed up against the O-ring 107 by the gas flow cover 108. The gas flow cover 108 includes a gas inlet fitting 110 aligned with a first through hole (or passage) 111 leading to a gas chamber 112. A second through hole (or passage) 113 leads to a gas outlet fitting 114 of the gas flow cover 108. The gas flow cover 108 may be fabricated from Plexiglass or other appropriate material and can be secured to the cell body 104 by fasteners such as, e.g., 4 screws (not shown) that pass through openings 109 in the gas flow cover 108. As shown in FIG. 1, another electrode 117 was provided on the opposite side of the electrolyte volume 105 and sealed against an O-ring 116 by pressure from cover 118.

The electrolyte volume (or chamber) 105 included an electrolyte gas purge tube (and fitting) 120, which extended from the electrolyte volume 105 through a top cover, as illustrated in FIG. 1B, to purge the cell with inert gas prior to measurements. For three terminal chrono-amperometric measurements, a counter electrode 121 (e.g., a glassy carbon electrode or a platinum flag electrode) and a reference electrode 122 (e.g., an Ag/AgCl electrode) were included in the electrolyte volume 105.

In testing and use, the SWNT film 101 side of the membrane 103 was placed across the sidewall opening 106 in the cell body 104, and a leak free seal was formed around the perimeter of the opening 106 using a compliant O-ring. During testing, to avoid electrochemical dissolution of the metallic electrode 102 that makes contact with the SWNT film 101, the metal was arranged to lie beyond the boundary of the seal 107 away from the electrolyte. In operation, the cell is filled with electrolyte, which wets the SWNT film 101 through to the membrane surface. However, because of the lyophobicity of the membrane 103, the electrolyte does not penetrate into its open pore structure. The opposite side of the membrane 103 is exposed to a gas phase medium including $CO_2$ in the gas chamber 112. The $CO_2$ permeates by diffusion through the pores of the membrane 103 at the three-phase interface including the gas or vapor phase carbon dioxide, the (solid) SWNT film, and the liquid electrolyte. At the three phase interface, $CO_2$ dissolves into the surface layer of the electrolyte, wetting the SWNTs, and is reduced electrochemically upon contact with the SWNTs.

TABLE 1 shows various reaction pathways that may be present at the SWNT film 101 electrode during operation of the cell of FIGS. 1A and 1B. TABLE 1 also indicates the number of electrons involved, products, and the thermodynamic potentials for the reaction pathways (referenced to a normal hydrogen electrode (NHE)).

TABLE 1

| $CO_2$ reduction pathways & number of electrons involved | Product | Thermodynamic potentials for the reaction at pH 9 |
| --- | --- | --- |
| $CO_2 + H^+ + 2e^- \leftrightarrow HCOO^-$ | formic acid ion | −0.756 |
| $CO_2 + 2H^+ + 2e^- \leftrightarrow CO + H_2O$ | carbon | −0.69 |
| $CO_2 + 6H^+ + 6e^- \leftrightarrow CH_3OH + H_2O$ | methanol | −0.498 |

TABLE 1-continued

| $CO_2$ reduction pathways & number of electrons involved | Product | Thermodynamic potentials for the reaction at pH 9 |
|---|---|---|
| $CO_2 + 8H^+ + 8e^- \leftrightarrow CH_4 + 2H_2O$ | methane | −0.362 |
| $CO_2 + 12H^+ + 12e^- \leftrightarrow C_2H_4 + 4H_2O$ | ethane | −0.452 |

Figure 2:
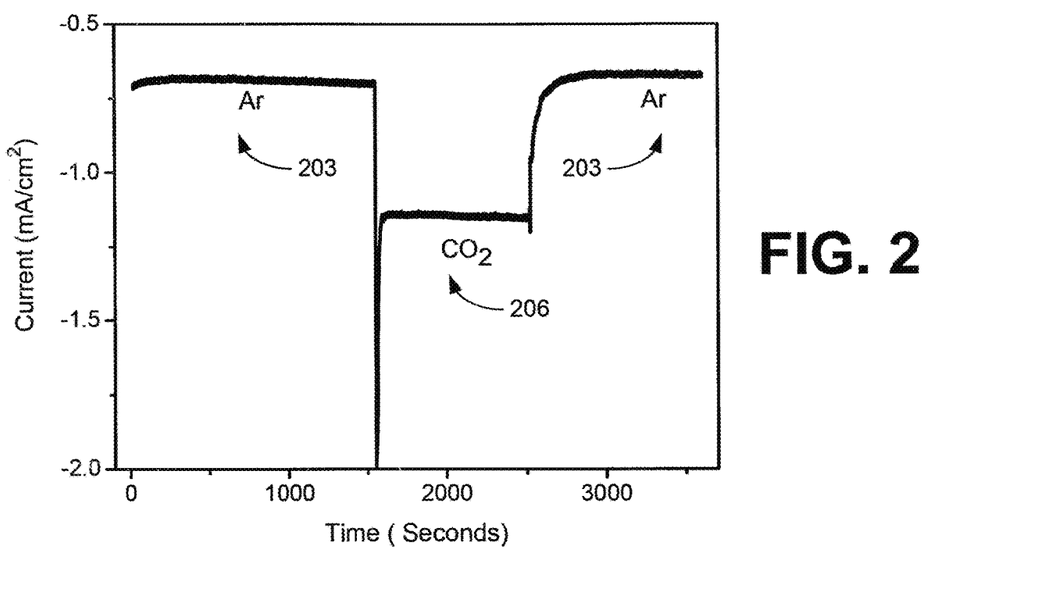
FIG. 2 is a plot illustrating an example of a chronoamperometry response of a SWNT film in accordance with various embodiments of the present disclosure.

Referring next to FIG. 2, shown is an example of the results of a three terminal chrono-amperometry measurement on the SWNT film working electrode (a 1.5 µm thick SWNT film 101 on a PTFE membrane 103) in dimethylformamide (DMF) with 0.1M tetrabutylammonium hexafluorophosphate (TBAPF$_6$) and 2M water (H$_2$O). Similar results were also obtained with 0.1M tetrabutylammonium tetrafiuoroborate (TBABF$_4$) salt in DMF with 2M H$_2$O. The electrolyte was purged with argon (Ar) for 1 hour prior to the measurement to remove the dissolved oxygen. The electrolyte was kept under an argon blanket while the back side of the porous membrane 103 was exposed, via the gas chamber 112, to Ar 203 or CO$_2$ 206 as indicated in the plot of FIG. 2. Upon such gas exposure, the SWNT film working electrode was adjusted to −0.79 V versus NHE.

It can be seen that immediately upon exposure to the CO$_2$, an appreciable reduction current was obtained at −0.79 V vs. NHE (an overpotential of only 0.10 V relative to the thermodynamic potential for CO production). The electrolytes used here were used to allow direct comparison with iron 5,10,15,20-tetrakis(2,6-dihydroxylphenyl)-porphyrin (Fe TDHPP) catalyst, which has shown the highest CO$_2$ reduction activity among the nonprecious metal based catalysts. The Fe TDHPP catalyst evidenced a CO$_2$ reduction current of 0.31 mA/cm$^2$ at a potential of −1.16 V vs. NHE (an overpotential of −0.47 V relative to the thermodynamic potential for CO production), whereas the SWNT film electrode showed CO$_2$ reduction currents of 0.42 mA/cm$^2$ at −0.79 V vs. NHE (an overpotential of 0.1 V). As indcted in TABLE 1, possible products include HCOOH, CO, CH$_3$OH, CH$_4$, C$_2$H$_4$, all of which may be useful. The low overpotential for the reaction is remarkable. Also of note in the plot 203 of FIG. 2 is the stability of the reaction during the CO$_2$ exposure 206.

Figure 3:
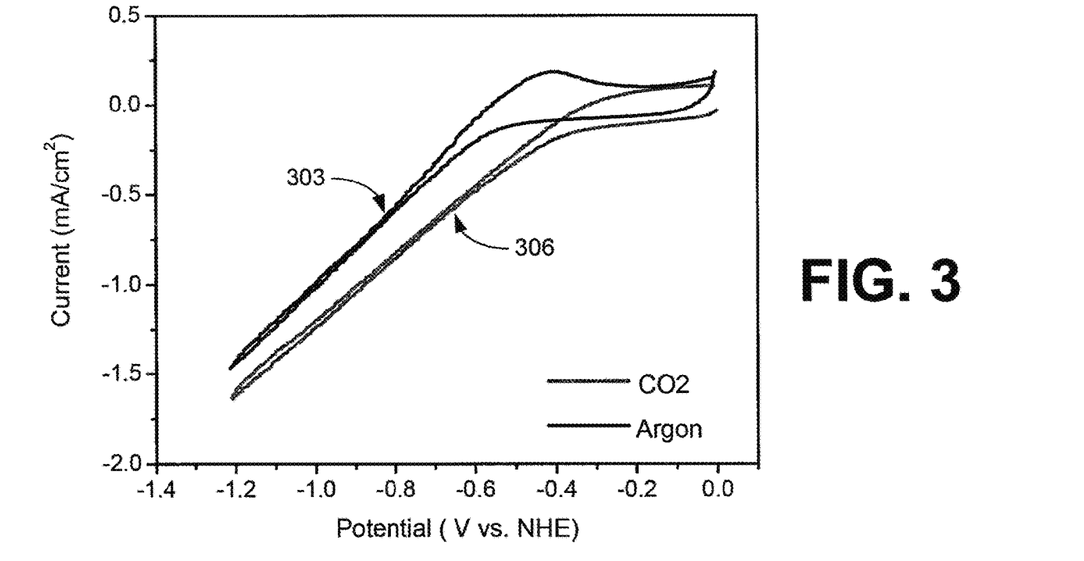
FIG. 3 is a plot illustrating examples of cyclic voltammograms of a SWNT film electrode in Ar and $CO_2$ saturated electrolyte in accordance with various embodiments of the present disclosure.

FIG. 3 shows an example of cyclic voltammograms (CV) of a SWNT film (e.g., a 1.5 µm thick SWNT film 101 on a PTFE membrane 103) electrode in DMF with 0.1M TBABF$_4$ and 2M H$_2$O. The electrolyte was saturated with Ar or CO$_2$ by purging with the respective gases for 1 hour prior to each measurement. Curves 303 and 306 are the CVs (scan rate 10 mV/s) in the Ar and CO$_2$ saturated electrolyte, respectively. In the absence of CO$_2$ (i.e., when Ar purged), the current likely corresponds to hydrogen reduction (as a precursor to H evolution) from the water in the DMF. In the presence of CO$_2$, its reduction initiates at just below 0.4 V (vs. NHE), evidencing less than 50 mV overpotential with respect to the thermodynamic potential of methane production.

A rotating ring disk electrode (RRDE) measurement was also performed on a SWNT film transferred onto a glassy carbon disk electrode. To transfer the nanotubes onto the disk electrode, a SWNT film (300 nm) was fabricated on a PTFE membrane (0.2 µm pore) using a filtration method. The SWNT film (5 mm diameter) with PTFE membrane was placed on top of the glassy carbon disk electrode (5 mm diameter) with the nanotubes facing the disk. A single drop of methanol was placed on the back side of the PTFE membrane to wet the PTFE, thereby delaminating the film from the SWNT film electrode and facilitating intimate contact between the nanotubes and the glassy carbon electrode as the methanol evaporated. Once the disk completely dried, the PTFE membrane was slowly removed leaving behind the SWNT film on the glassy carbon disk. The glassy carbon electrode containing the SWNT film was then mounted onto the RRDE set up (using a setup manufactured by Pine Instrument).

Figure 4:
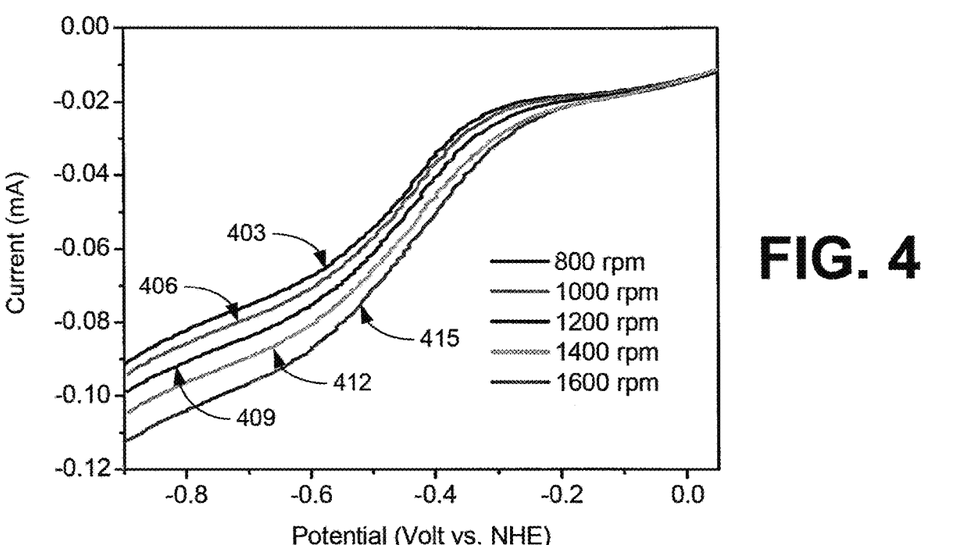
FIG. 4 is a plot illustrating linear sweep voltammograms of a SWNT disk electrode at different rotation rates in accordance with various embodiments of the present disclosure.

The CO$_2$ reduction measurement was performed in DMF with 0.1M TBABF$_4$ and 2M H$_2$O. The electrolyte was purged with Ar for 1 hour to remove dissolved oxygen and other gases, followed by purging for another hour with pure CO$_2$ to saturate the electrolyte. Measurements were performed with a CO$_2$ blanket over the electrolyte. CV curves obtained in the Ar and CO$_2$ saturated electrolyte in the glass electrochemical cell were very similar to curves obtained in Teflon cell. FIG. 4 shows examples of a linear sweep voltammetry (LSV) (with a scan rate of 10 mV/s) of the SWNT film electrode at different rotation speeds—curve 403 at 800 rpm, curve 406 at 1000 rpm, curve 409 at 1200 rpm, curve 412 at 1400 rpm and curve 415 at 1600 rpm. The currents increase with rotation speed, suggesting that the reduction currents may be diffusion limited. This suggests that the cathodic currents of the SWNT film may be due to reduction of the dissolved CO$_2$ in the electrolyte.

Figure 5:
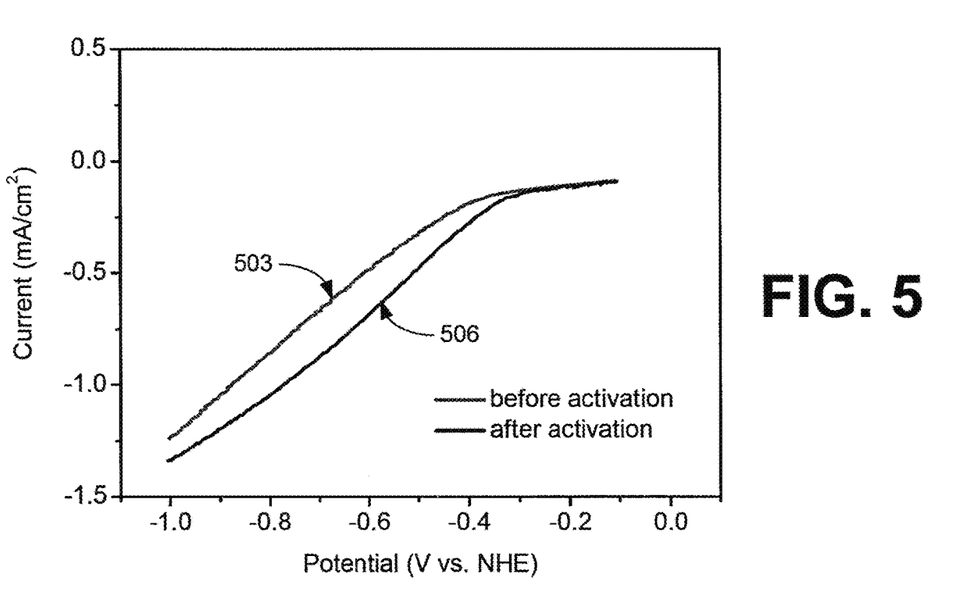
FIG. 5 is a plot illustrating an example of $CO_2$ reduction activity of a SWNT film before and after electrochemical activation in accordance with various embodiments of the present disclosure.

An activation process, which is described in a PCT Application No PCT/US2011/065569 filed on Dec. 16, 2011, which is hereby incorporated by reference in its entirety, can enhance the CO$_2$ reduction over the activated SWNTs. A SWNT film 101 (about 1.5 µm thick) working electrode was fabricated on PTFE membrane 103 using a vacuum filtration method. A thicker SWNT film coupled to carbon paper was used to make electrical connection to the SWNT working electrode. Activation of the SWNTs comprises contacting the SWNT film 101 with an acid solution for a sufficient period of time with a number of cathodic cycles induced over the course of the exposure. The SWNT working electrode was activated in 1M nitric acid in the electrochemical cell using glassy carbon as the counter electrode and an Ag/AgCl reference electrode. After the electrochemical activation of the SWNT film 101, the electrochemical cell was washed with copious amounts of water to remove any residual acid and the SWNT film 101 was washed in two overnight water baths (12 hours each) and 8 subsequent water baths (2 hours each). Finally, the SWNT film 101 was rinsed with DMF electrolyte (0.1M TBABF$_4$ and 2M H$_2$O) and then bathed in this electrolyte for 2 hours before its replacement for the measurement. The electrolyte was subsequently purged with Ar for 1 hour to remove dissolved O$_2$ and other gases followed by saturation with pure CO$_2$.

A CO$_2$ blanket was maintained over the electrolyte during the measurements. A linear sweep voltammogram (with a scan rate of 10 mV/s) was recorded on the activated SWNT film 101 electrode using a glassy carbon counter electrode. FIG. 5 shows the CO$_2$ reduction currents on SWNT film before (curve 503) and after (curve 506) the electrochemical activation. As can be seen, the activated the SWNT film 101 showed higher CO$_2$ reduction currents and also an anodically shifted onset potential, implying a greater activity of the SWNT film towards the CO$_2$ reduction once activated.

A working embodiment of a device designed to catalyze CO$_2$ electroreduction can include the following features: 1) a working electrode consisting of SWNTs, or other layered, sp$^2$ bonded carbon (e.g., graphitic carbon compact) materials; 2) a counterelectrode (e.g., Pt, Pd, Ni, stainless steel, glassy carbon, oxide semiconductor or other electrical conductor); 3) a liquid electrolyte or a solid electrolyte membrane in electrical communication with both electrodes; 4) a separator that permits liquid electrolyte ion transport across it but minimizes the exchange of reaction products between the working electrode and the counter electrode (i.e., the electrodes occupying compartments effectively separated by this separator); and/or 5) the facility to collect the reaction products of the $CO_2$ electroreduction reaction.

In some embodiments the electrodes are made porous, and $CO_2$ saturated electrolyte is forced through the $CO_2$ reduction electrode to maximize the electrode exposure to the $CO_2$ to be reduced.

Possible electrolyte systems include: non-aqueous solvents such as, e.g., methanol, acetonitrile, dimethylsulfoxide, tetrahydrofuran and their mixtures with water, as well as other non-aqueous solvents in which the $CO_2$ saturation concentration exceeds that available in pure water, mixed with electrolyte salts which can include (but are not limited to): lithium, sodium or potassium tetralkylammonium cations with one or more of hexafluorophosphate, tetrafluoroborate, or perchlorate anions. Alternatively, the electrolyte can consist of water miscible ionic liquids such as (but not limited to): 1,3-dialkylimidazolium cation with the foregoing anions, 1,3-dialkylpyrrolidinium cation with the foregoing anions. Different electrolytes including acids or bases may also be mixed into these systems. Distinct electrolytes may be used in the two separated compartments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
providing an electrolyte including dissolved carbon dioxide ($CO_2$) to an $sp^2$ bonded carbon electrode; and
reducing the dissolved $CO_2$ via electroreduction at an interface between the electrolyte, the dissolved $CO_2$, and the $sp^2$ bonded carbon electrode by powering the $sp^2$ bonded carbon electrode,
wherein $CO_2$ reduction initiates at an overpotential of about 1 V or less in amplitude relative to a thermodynamic potential for a reaction pathway associated with the reduction of the dissolved $CO_2$, and wherein the $sp^2$ bonded carbon electrode does not comprise a metal catalyst.

2. The method of claim 1, wherein the electrolyte further includes dimethylformamide (DMF).

3. The method of claim 1, further comprising mixing $CO_2$ with the electrolyte to produce the electrolyte including dissolved $CO_2$.

4. The method of claim 3, wherein mixing $CO_2$ with the electrolyte comprises remotely mixing the $CO_2$ with the electrolyte.

5. The method of claim 1, wherein providing the electrolyte including dissolved $CO_2$ comprises diffusing $CO_2$ through a lyophobic, porous membrane to mix with the electrolyte.

6. The method of claim 5, wherein the lyophobic, porous membrane comprises a first side and a second side opposite the first side, and wherein the $sp^2$ bonded carbon electrode is disposed on the first side of the lyophobic, porous membrane, and wherein diffusing the $CO_2$ through the lyophobic, porous membrane comprises:
diffusing the $CO_2$ through the lyophobic, porous membrane from the second side to the first side into the electrolyte.

7. The method of claim 1, wherein the $sp^2$ bonded carbon electrode comprises carbon nanotubes, carbon nanofibers, a carbon-carbon compact, a multilayer graphene film, reduced graphene oxide, pyrolytic graphite, and/or microcrystalline graphite.

8. The method of claim 1, wherein the $sp^2$ bonded carbon electrode comprises single wall carbon nanotubes.

9. The method of claim 1, wherein the atomic percent of carbon in the $sp^2$ bonded carbon electrode is at least about 70%.

10. The method of claim 1, wherein the $sp^2$ bonded carbon electrode has a layered structure.

11. The method of claim 10, wherein the space between at least two adjacent layers of the layered structure is at least about 0.1 nm.

12. The method of claim 1, wherein the $sp^2$ bonded carbon electrode has a sheet resistance of about 500 ohms/sq or less.

13. The method of claim 1, wherein the $CO_2$ reduction produces at least one of formate, acetate, carbon monoxide, methanol, ethanol, methane, ethane, formaldehyde, or acetaldehyde.

14. The method of claim 1, wherein powering the $sp^2$ bonded carbon electrode comprises providing power to the $sp^2$ bonded carbon electrode via a contact electrode that overlaps a portion of the $sp^2$ bonded carbon electrode.

15. The method of claim 1, further comprising powering an anode in contact with the electrolyte.

16. The method of claim 1, wherein the $sp^2$ bonded carbon electrode has an atomic percent of carbon of at least 99%.

* * * * *